Aug. 11, 1942.  W. J. GARLICK, JR  2,292,514
CONTROL APPARATUS FOR ELECTRICAL CIRCUITS
Filed Oct. 8, 1940
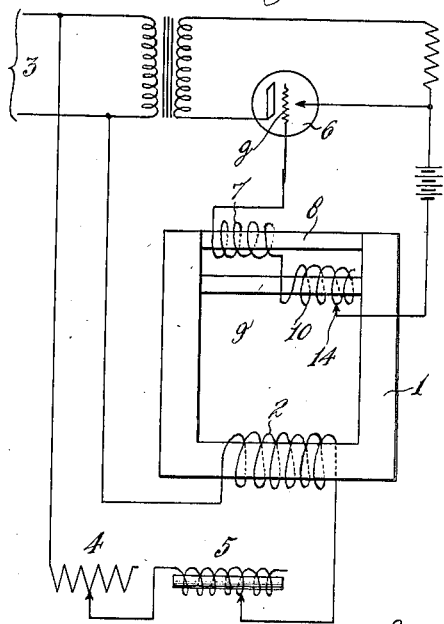
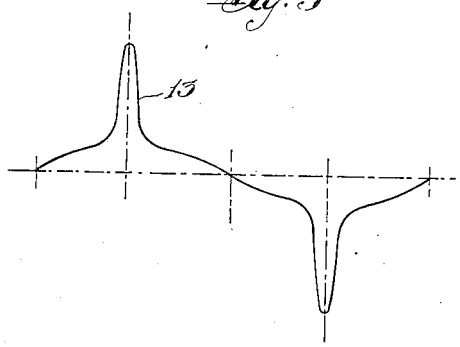
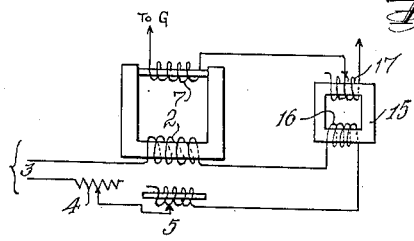
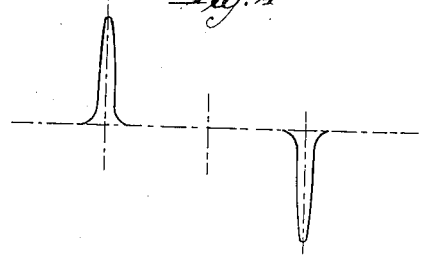
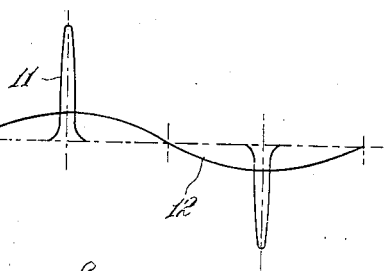
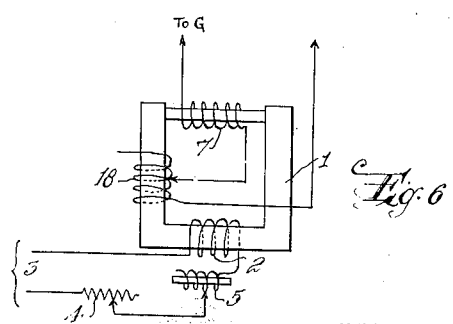
INVENTOR
Wer J. Garlick Jr.
BY
A. D. T. Libby Patented Aug. 11, 1942

2,292,514

UNITED STATES PATENT OFFICE 2,292,514

CONTROL APPARATUS FOR ELECTRICAL CIRCUITS

Walter J. Garlick, Jr., Upper Montclair, N. J., assignor to American Transformer Company, Newark, N. J.

Application October 8, 1940, Serial No. 360,267

8 Claims. (Cl. 171—119)

This invention relates to means for increasing the sensitivity and stability of control apparatus and governing parts in an electrical circuit, wherein at least one of the governing parts comprises a thermionic tube or relay in which the grid is an element directly acted on by other control devices or apparatus.

In operating, for example, a grid control rectifier tube, one common method of control is the application to the grid of the tube a voltage of the same frequency as the plate voltage. This voltage, however, may be shifted in phase with respect to the plate voltage, in which case maximum output current for a given plate voltage is obtained when the tube discharge or fires over a complete half cycle, which condition obtains when plate and grid voltages are in phase.

As the grid voltage is shifted so that it lags, for example the plate voltage, more and more, the current flow will decrease because the breakdown point at which the grid allows the plate circuit of the tube to conduct current occurs later in the plate voltage cycle. Finally, when the grid voltage is shifted 180 degrees, so that it is then of opposite phase to the plate voltage, the current flow will be zero. The point at which the tube fires is dependent upon the magnitude and phase of the plate and grid voltages and the tube characteristics.

It is the object of my present invention to provide a more sensitive and stable, and therefore better control on the grid of a governing tube relay, and I accomplish the object of my invention by utilizing a control apparatus for the tube relay in the form of a peaking transformer having characteristics which I believe to be new and improved.

Peaking transformers have been used in connection with grid control or governing tubes in various types of electrical circuits, and it has been found that where the grid control coil of the transformer is used in connection with a peaking transformer, and the grid control coil is positioned on a part of the transformer core which is saturable, two voltages are induced in the grid control coil. One voltage is set up by the magnetic flux passing through that portion of the core on which the control coil or winding is positioned, and another voltage is set up by the air gap flux adjacent to the saturable part of the core.

These voltages, together with my improved arrangement, are shown in the annexed drawing, wherein:

Figure 1 is a schematic circuit arrangement showing the application of my invention to one type of electrical circuit.

Figure 2 illustrates the voltages usually generated in the transformer control coil.

Figure 3 illustrates the combined effect of the two voltages shown in Figure 2.

Figure 4 illustrates the voltage curve delivered by my improved type of peaking transformer shown in Figure 1.

Figure 5 is a view similar to Figure 1, showing a modified form of arrangement for balancing out the curve 12 of Figure 2.

Figure 6 shows a further modification for the same purpose as the arrangement of Figure 5.

In Figure 1, the transformer has a core 1 of suitable magnetic material having a primary winding 2 connected to a suitable source of alternating current 3. An adjustable resistance unit 4 and adjustable inductance 5 are preferably connected in series with the primary 2 so that the phase relation between the primary voltage and the line voltage may be varied, if desired, whereby the output of the peaking transformer may be accurately controlled to govern the point of firing of the rectifier tube 6, the grid $g$ of which is connected to the secondary 7 of the peaking transformer. The secondary coil or winding 7 is positioned on a portion 8 of the transformer, which portion is materially reduced in cross-section from the balance of the transformer core; in fact, the portion 8 may comprise only one lamination of a magnetic material which may be saturated at even lower density than that of the rest of the core of the transformer.

Mounted on a non-magnetic member 9 and closely adjacent the winding 7 so as to be within the range of the air gap flux around the core portion 8, is an auxiliary coil winding 10. The windings 7 and 10 are connected in series opposition in the grid circuit, as indicated in Figure 1. The voltage generated by the coil 7, due to the direct action of the flux through the core portion 8, is illustrated by the curve 11; while the second voltage generated in the coil 7, due to the air gap flux around the core portion 8, is illustrated by the curve 12. The combination of these curves produces a curve 13 as shown in Figure 3. A voltage curve having this characteristic, which is the usual type of curve used on a grid control tube, is not sufficiently sensitive and stable to produce the best results. To eliminate the voltage illustrated by the curve 12 in Figure 2, I have provided the winding 10 on the peaking transformer as heretofore described, and by properly choosing the number of turns, as by the adjustable contact 14, I can balance out the voltage 12 and obtain a sharp peaked curve as illustrated in Figure 4, which will produce a more sensitive and stable control on the governing tube 6.

In Figure 5 I have shown a modified arrangement for balancing out the voltage 12 of Figure 2. I do this by providing a small auxiliary transformer 15 having a primary winding 16 which may be connected in series or parallel with the winding 2 of the transformer 1. The secondary 17 of the transformer 15 has sufficient turns which are connected in opposition to the winding 7, as in Figure 1, to produce the necessary result.

In Figure 6 the arrangement is similar to Figure 1, except that the winding 18 is placed on the transformer 1 in such a position and with the proper number of turns, as to balance out the voltage 12. Other arrangements for doing this may also be used, but from the various tests which I have made, I prefer the arrangement shown in Figure 1.

While I have shown my improved type of peaking transformer in a rectifier circuit, yet it is understood that it is applicable in various other arrangements where a grid control tube is used.

What I claim is:

1. Control apparatus for an electrical circuit having governing parts therein including, a transformer having a core forming a single magnetic circuit of suitable magnetic material, a primary winding on the core, the core having a saturable portion with a secondary winding thereon, an auxiliary winding without a core of magnetic material located near enough to the secondary winding between those portions of the core carrying said saturable portion, so as to pick up stray flux set up by said secondary winding and connected in series opposition with the secondary winding, the terminals of the series-connected windings being adapted to be connected to certain of said governing parts of said electrical circuit.

2. Control apparatus for an electrical circuit having governing parts therein including, a transformer having a core forming a single magnetic circuit of suitable magnetic material with one portion of a much reduced cross-section whereby it can be quickly saturated magnetically, a primary winding on the core, a secondary winding on said reduced section and an auxiliary winding connected in series opposition to said secondary winding, said auxiliary winding being positioned to pick up air gap stray flux near said reduced section and emanating therefrom, the terminals of the series-connected windings being adapted to be connected to certain of said governing parts of said electrical circuit.

3. Control apparatus for an electrical circuit having governing parts therein including, a peaking transformer having a core forming a single magnetic circuit of suitable magnetic material with a primary winding thereon, a portion of the core being so small in cross-section as to be quickly saturated magnetically by the primary winding when suitable current is applied thereto, a secondary winding on said core portion of reduced cross-section and delivering a voltage having a peaked form, means for sharpening this form comprising an auxiliary winding without a magnetic core positioned to be excited by the stray flux coming from the secondary winding, the auxiliary winding being connected in series opposition to said secondary winding while the terminals of the two windings are adapted to be connected to certain of said governing parts of said electrical circuit.

4. Control apparatus for an electrical circuit having governing parts therein including a peaking transformer having a core forming a single magnetic circuit of suitable magnetic material with a primary winding thereon, a portion of the core being so small in cross-section as to be quickly saturated magnetically by the primary winding when suitable current is applied thereto, means for changing the phase relation of the voltage across the primary winding and the supply voltage of the circuit, a secondary winding on said core portion of reduced cross-section and delivering a voltage having a peaked form, means for sharpening this form comprising an auxiliary winding without a magnetic core positioned to be excited by the stray flux passing outside the secondary winding, the auxiliary winding being adjustable and connected in series opposition to said secondary winding while the terminals of the two windings are adapted to be connected to certain of said governing parts of said electrical circuit.

5. Control apparatus for an electrical circuit having governing parts therein including, a peaking transformer having a core forming a single magnetic circuit of suitable magnetic material with a primary winding thereon, a portion of the core being so small in cross-section as to be quickly saturated magnetically by the primary winding when suitable current is applied thereto, a secondary winding on said core portion of reduced cross-section and having two voltages induced therein, one by the flux that passes through the core portion carrying the secondary, and the other a detrimental voltage produced by air gap stray flux outside said core portion, and means for eliminating said detrimental voltage, said means comprising an auxiliary winding positioned to be excited by the air gap stray flux in the vicinity of the core carrying the secondary winding, these windings being connected in series opposition and to said governing parts of the circuit.

6. A peaking transformer for the purposes described having a core forming a single magnetic circuit of suitable magnetic material, a portion of the core being of much reduced cross-section whereby it may be quickly saturated magnetically, a primary winding for exciting the core, a secondary winding on the reduced core portion and an auxiliary winding located so as to be excited by air gap flux adjacent the said reduced core portion, the secondary and auxiliary windings being connected in series opposition whereby the voltage delivered from the free terminals of these windings has a wave form of material sharpness.

7. A peaking transformer for the purposes described having a core forming a single magnetic circuit of suitable magnetic material, a portion of the core being of much reduced cross-section whereby it may be quickly saturated magnetically, a primary winding for exciting the core, a secondary winding on the reduced core portion and means for balancing out a detrimental voltage which may be set up in the secondary winding due to air gap flux around the core carrying the secondary winding.

8. A peaking transformer for the purposes described having a core forming a single magnetic circuit of suitable magnetic material, a portion of the core being of much reduced cross-section whereby it may be quickly saturated magnetically, a primary winding for exciting the core, a secondary winding on the reduced core portion and a winding positioned on the core of the transformer and connected to said secondary winding so as to balance out a detrimental voltage which may be set up in this secondary winding by air gap flux around the core part carrying it.

WALTER J. GARLICK, Jr.